United States Patent [19]

Buzzi

[11] 4,083,584
[45] Apr. 11, 1978

[54] APPARATUS FOR SECURING A FLANGE FERRULE TO THE END OF A FLEXIBLE TUBE, PARTICULARLY A SHOWER TUBE

[75] Inventor: Günter Buzzi, Schiltach, Germany

[73] Assignee: Hans Grohe KG, Germany

[21] Appl. No.: 702,348

[22] Filed: Jul. 2, 1976

[30] Foreign Application Priority Data

Jul. 3, 1975  Germany .............................. 2529666
Jan. 13, 1976  Germany ........................ 7600734[U]

[51] Int. Cl.² ............................................ F16L 33/20
[52] U.S. Cl. ...................................... 285/258; 285/331
[58] Field of Search ............... 285/248, 256, 258, 259, 285/149, 382.4, 54, 331, 251; 29/507, 237

[56] References Cited

U.S. PATENT DOCUMENTS

| 1,839,338 | 1/1932 | Pentz ..................................... 285/258 |
| 1,928,836 | 10/1933 | Loughead ......................... 285/258 X |
| 1,953,665 | 4/1934 | Wallace .............................. 285/382.4 |
| 1,969,203 | 8/1934 | Cadden et al. ........................ 285/256 |
| 2,918,314 | 12/1959 | Kemnitz ............................. 285/251 X |

FOREIGN PATENT DOCUMENTS

| 149,232 | 12/1952 | Australia ............................... 285/258 |
| 1,965,422 | 7/1970 | Germany ............................... 285/331 |
| 173,894 | 1/1961 | Sweden .................................. 285/258 |

*Primary Examiner*—Dave W. Arola
*Attorney, Agent, or Firm*—McGlew and Tuttle

[57] ABSTRACT

A method of securing a flange ferrule to the end of a flexible tube having an exterior diameter slightly smaller than the interior diameter of the ferrule, comprises positioning the flange ferrule over the end of the flexible tube and aligning the flange at the end of the ferrule with the end of the tube, placing a flange clamp bushing which has an outer diameter smaller than the inside diameter of the tube into the tube and aligning a flange of the clamp bushing with the flange of the ferrule and, thereafter, expanding the clamp bushing outwardly into engagement with the wall of the tube. Before the outward expansion of the clamp bushing is effected, the clamp bushing and the ferrule are positioned in a matrix which has a receiving cavity with an outline conforming to the flange ferrule and the tube end and the clamp bushing. After the assembly is held in the matrix, a flaring tool or expander is inserted into the bore of the clamp bushing in order to expand the clamp bushing outwardly into the wall of the tube. A flexible tube fitment, comprises the flange ferrule and the flange clamping bushing which has its flange interengaged over the flange of the ferrule and which is forced into engagement with the wall of the tube. Advantageously, an elastically deformable material or bonding material is inserted between the end of the tube and the flange of the clamp bushing. The clamp bushing may be of a length equal to, less than, or greater than, the outside flange ferrule.

1 Claim, 6 Drawing Figures

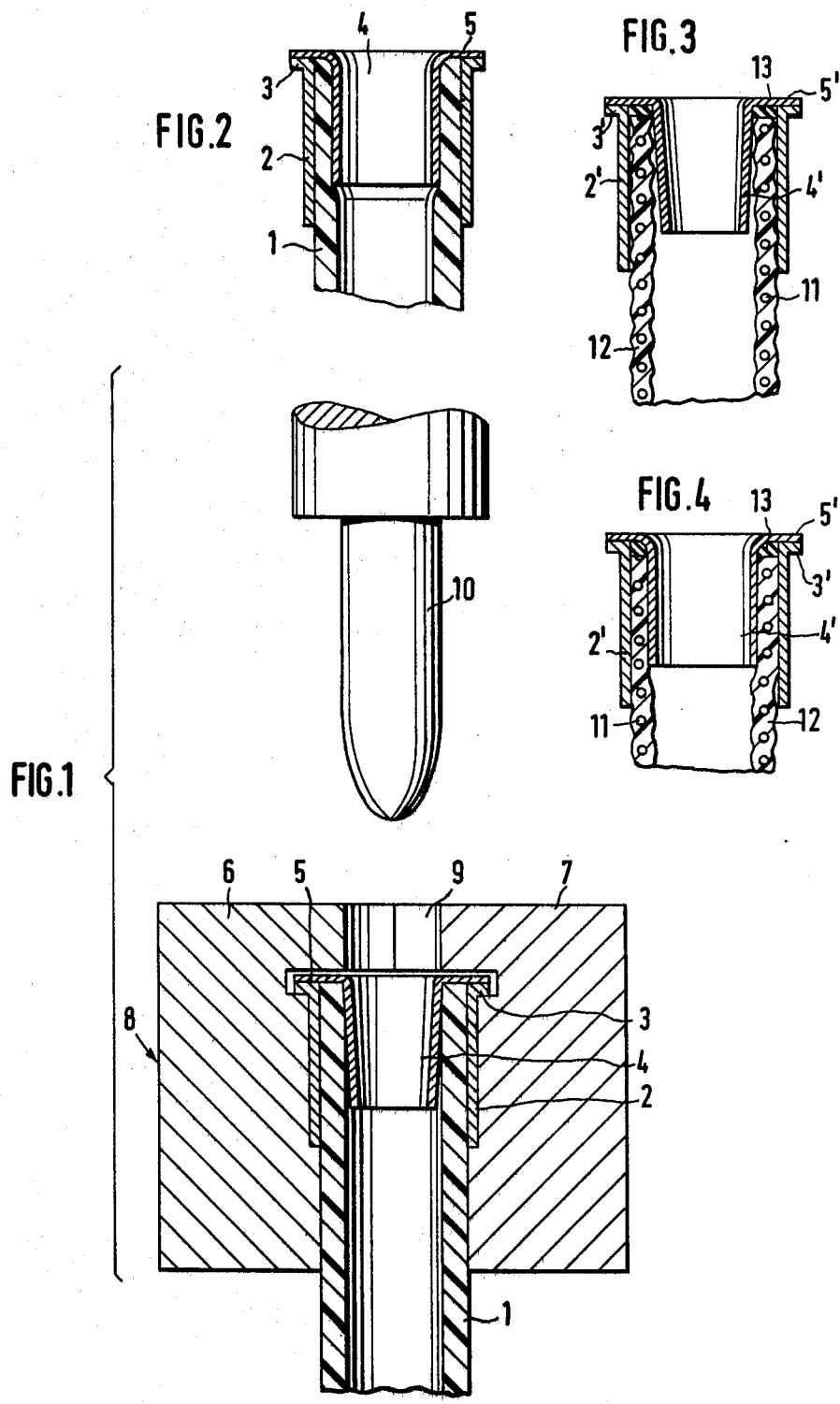

APPARATUS FOR SECURING A FLANGE FERRULE TO THE END OF A FLEXIBLE TUBE, PARTICULARLY A SHOWER TUBE

FIELD AND BACKGROUND OF THE INVENTION

This invention relates in general to a method and apparatus for securing fitments to the end of a coupling hose and, in particular, to a new and useful method of securing a flange ferrule to the end of a flexible tube, such as a shower tube, made of elastic material, and which comprises an exterior tubular ferrule which fits over the flexible tube and which has an end flange which aligns with the end of the tube and which also includes an interior clamp bushing which has a flange which aligns over the end of the tube and the flange of the flange ferrule and which is expanded outwardly into the wall of the tube.

DESCRIPTION OF THE PRIOR ART

In order to secure rubber or plastic tubes to sanitary fittings and to hand shower heads by means of coupling nuts, the ends of the flexible tubes must be provided with a flange ferrule or fitment. In the prior art, the tube end is engaged in the flange ferrule and a clamping bushing which has an outer diameter which is larger than the inner diameter of the tube is pressed into the tube so that the wall of the tube becomes clamped between the flange ferrule and the clamp bushing. However, to be able to introduce the clamp bushing axially into the narrower tube end, it is necessary to design the clamp bushing with some taper, and this results in the disadvantage that the clamping effect is not equally distributed over the entire axial length of the clamping bushing. In addition, this known method has the drawback that it can be used only with tubes having completely smooth inner and outer surfaces and which are made of a homogeneous material. With tubes which are provided with reinforcing spirals or helical intermediate layers, which reinforce the walls thereof, a pressing into place of a clamp bushing in accordance with the known methods is difficult for many reasons. Even with a relatively strong taper of the clamp bushing, it is unavoidable that during the pressing operation, the end of the tube is squeezed out of the flange ferrule or the structure of the tube material, particularly if a multilayer tube is involved, is changed and, thereby, the resistance of the tube itself is affected. Experience has shown that due to the axial pressing in place of the clamp bushing, the reinforcement spiral of a tube is compressed so that a waterproof connection between the tube and the flange ferrule can no longer be ensured.

SUMMARY OF THE INVENTION

The present invention provides a method in which the drawbacks of the prior art constructions are avoided and by which a uniform clamping connection between the tube and the flange ferrule over the entire length of the clamp bushing is ensured, and the risk of damaging the clamped end of the tube is eliminated.

The invention provides a clamp bushing which is formed with an annular flange and, initially, the clamp bushing has a smaller outer diameter than the interior diameter of the tube into which it is introduced. The clamp bushing is introduced until its flange overlies the flange of the flange ferrule and an expander is inserted into the clamp bushing and expands the walls of the clamp bushing outwardly to engage into the wall of the tube when it reaches the clamping diameter. With the inventive method, a particular advantage is obtained by the fact that no axial forces are exerted on the tube itself during the clamping so that neither a displacement of the tube walls of its reinforcing elements, nor a compression of the material in the axial direction can occur. In addition, the inventive method insures a completely uniform clamping effect of the entire length of the clamp bushing, it being assumed that the clamp bushing is not longer than the flange ferrule. In order to prevent a shearing or cutting effect at the end of the clamp bushing, it is useful and advantageous to provide a shorter length for the clamp bushing than for the flange ferrule.

To ensure a leakproof connection between the tube end and the flange ferrule, even with plastic tubes which are equipped with reinforcing elements or spiral coils, in accordance with another embodiment of the invention, there is a gasket ring which is made of an elastically deformable material and which is placed between the circular front face of the clamping bushing flange and the end of the tube and the flange of the clamp bushing.

In order to further improve the fastening of the flange ferrule by means of a clamping connection on tubes so as to obtain an absolutely tight connection between the flange ferrule and/or clamp bushing and the end portion of the tube, a preferred arrangement provides that an elastically deformable sealing member is mounted between a portion of the flange ferrule which is formed with an enlarged diameter adjacent its flange, and the internal clamp bushing. The sealing member comprises a neck portion engaging the end portion of the tube from the interior and also a collar portion embracing the end portion of the tube. In this case it is important to form the clamp bushing with a flange which completely overlaps the sealing member in the radial direction. Therey a particular advantage is obtained in that the forces exerted or produced during the enlargement of the clamp bushing act not only radially against the inside and the outside of the tube, but also through the material displacement in the sealing member as well as against the front face of the tube. At this location because of the small area of the front face, a high specific pressure is produced which ensures an absolutely tight fit of the connection.

If elastic tubes are used with reinforcing strands or spirals therein which are in outlines of the surface of the tube, the fastening of the flange ferrule to the tube is also watertight since, in this case, a combined force and form-closed connection is produced which, due to the elastic deformability of the sealing member as well as of the tube material, is capable of withstanding high mechanical stresses.

Accordingly, it is an object of the invention to provide an improved method of forming a fitment on the end of a tube which comprises inserting a flange ferrule having a diameter slightly larger than the exterior diameter of the tube over the tube end and aligning a flange of the flange ferrule with the end of the tube, thereafter, inserting a clamping bushing having a diameter slightly smaller than the interior diameter of the tube into the tube and aligning a flange of the bushing over the flange of the ferrule and over the end of the tube and then expanding the clamp bushing inside the tube until it engages into the wall of the tube in sealing engagement therewith.

Another object of the invention is to provide a flexible tube fitment comprising an outer ferrule engaged over the periphery of the tube adjacent its end and which has a flange aligned with the end and an inner clamping bushing which is of a diameter smaller than the interior diameter of the tube positioned in the tube and having a flange engaged over the flange of the ferrule and the end of the tube and wherein the wall of the ferrule is expanded outwardly into the tube wall into sealing engagement therewith.

A further object of the invention is to provide a tube fitment which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

In the Drawings

FIG. 1 is a partial sectional and elevational view of a device for applying a fitment to a tube end showing a flaring tool positioned over a matrix containing the tube being fitted and constructed in accordance with the invention;

FIG. 2 is a partial sectional view of a tube having a fitment constructed in accordance with the invention;

FIG. 3 is a view similar to FIG. 2 of another embodiment of the invention;

FIG. 4 is a view similar to FIG. 3 but showing the clamp bushing after enlargement of the clamp bushing into the walls of the tube;

DESCRIPTION OF THE PREFERRED EMBODIMENTS

Figure 5:
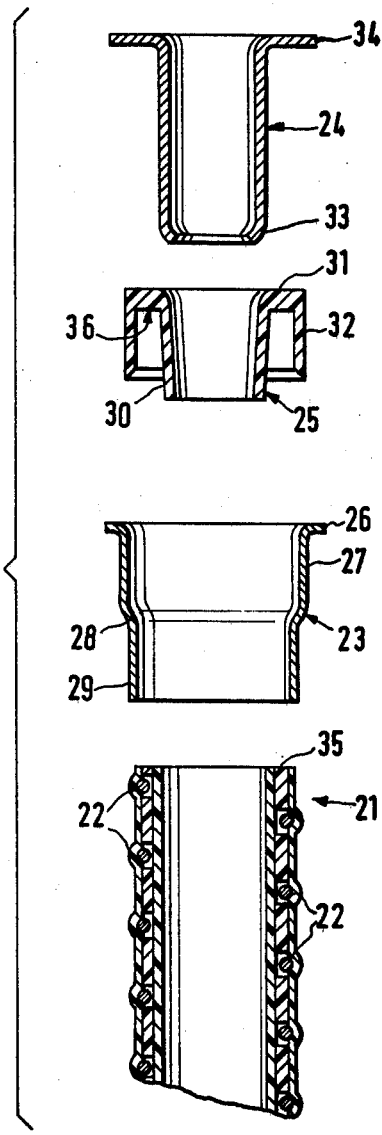
FIG. 5 is a partial exploded view of a flexible tube being fitted with a fitment in accordance with the invention.

Referring to the drawings in particular, the invention embodied therein in FIGS. 1 and 2, comprises a tube fitment, generally designated 10, which includes a flexible tube 1 made of a homogeneous elastically deformable material, such as a natural rubber, synthetic rubber, polyurethane, or the like. In accordance with the invention, the tube is covered by a flange ferrule 2 which has an outer end with a flange 3 which is aligned with an end of tube 1. Flange ferrule 2 has an inner diameter which corresponds approximately to the normal outer diameter of tube 1. A fastening ferrule or clamp bushing 4 has an initial outer diameter which is smaller than the interior diameter of the tube so that it may be easily inserted into the tube 1. It includes a flange 5 which is aligned over the flange 3 of ferrule 2 and over the end of tube 1.

In accordance with the method of the invention, after the clamping ferrule is positioned inside the tube 1, as shown in FIG. 1, it is placed in a matrix 8. The length of the flange 2 in an axial direction is less than that of the ferrule and its flange 5 is loosely engaged over flange 3. This ensures that flange 5 applies against both the end face of tube 1 and flange 3 of flange ferrule 2. In such a loosely assembled state, the tube end portion along with the flange ferrule 2 and a clamp bushing 4 are enclosed by the matrix which is made of two symmetrical parts 6 and 7 and which is provided with a cavity which is conformable to the cross-section of the assembly of the parts 1, 2 and 4. The matrix is provided with a bore 9 through which a flaring expander tool 10 is inserted or driven by means (not shown).

Both the flange ferrule 2 and the clamp bushing 4 are advantageously made of metal such as brass, and ferrule 2 has thicker walls than the clamp bushing 4 which must be capable of being drawn. By driving expander 10 downwardly into bore 9 and into the bore of clamp bushing 4, bushing 4 is formed to a shape having an enlarged diameter, as shown in FIG. 2, whereby the wall of the tube is compressed by the engagement of the enlarged clamp bushing 4 and the three initially loosely assembled parts 1, 2 and 4 become connected to each other by a force closure.

In the embodiment of FIGS. 3 and 4, similar parts are shown by similar numbers but with a prime. In this construction, a flexible tube 12 is provided to which a flange ferrule 2' is to be fastened by means of a clamp bushing 4'. Tube 12 is provided with a reinforcement such as a spiral winding of a strand or metal fiber 11. With tubes of this kind, it is advisable to place a material, such as an elastically deformable gasket ring or bonding material 13 between the front side circular face of the tube and the flange 5' of the clamping bushing 4' in order to provide a leakproof connection between tube 12 and ferrule 2' as soon as bushing 4' is enlarged. With tubes such as the tube 12 which have the reinforcement spirals 11, neither their inside surface nor their outside surface is completely smooth so that a non-uniform contact pressure is produced both at the outer and inner surfaces of the tube. It may happen that on the inside as well as the outside of the tube in the zone of the clamp bushing, that some leakage grooves are formed which extend helically up to the end of the tube and through which water could escape. For this reason, the material 13 which is elastically deformable, is provided between the front face of the tube and flange 5' of bushing 4' to ensure a leakproof connection.

In FIG. 3, the flange ferrule 2' and clamp bushing 4' are shown in a position in which they are loosely engaged over the end portion of tube 12. FIG. 4 shows a sectional view of the end portion of tube 12 where clamp bushing 4' is already enlarged. FIG. 4 also shows that during the expanding of bushing 4', the elastic material 13 is deformed in a manner such that it completely fills out and seals the intermediate space between the front side circular face of tube 12 and ferrule 2' as well as the bushing 4'.

Figure 6:
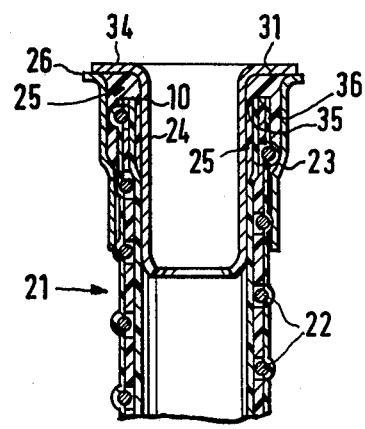
FIG. 6 is a partial sectional view of the ferrule shown in FIG. 5 in an assembled state.

In the embodiment shown in FIGS. 5 and 6, an end portion of a shower tube 21, which is made of elastic material and reinforced with a wire spiral 22 is fitted with a flange ferrule 23 which is arranged over the exterior of the tube 21 and is affixed by means of a clamp bushing 24 and a sealing member 25. Flange ferrule 23 is provided at one of its ends with a circular flange 26 which has an intermediate tubular flange portion 27 which is cylindrical and is of a slightly larger diameter than a lower flange portion 29. The intermediate portion 27 is of a larger diameter than the outside diameter of tube 21. An intermediate step portion 28 is formed between the portions 27 and 29. The cylindrical portion 29 has an interior diameter which substantially corresponds to the outside diameter of tube 21 so that the ferrule can be freely engaged over the end portion of the tube.

In this embodiment, a special sealing member 25 comprises a conical neck portion which tapers inwardly in a downward direction, and is designated 30, and which includes a maximum diameter which corresponds at least approximately to the interior diameter of tube 21. A circular web portion or flange 31 joins an annular collar portion 32 integrally with the conical portion 30. In the engaged position, the collar 32 surrounds the exterior of the tube 21. The outside diameter of collar 32 corresponds at least approximately to the inside diameter of the cylindrical portion 27 of ferrule 23. While the length of collar 32 of sealing member 25 corresponds to the length of the cylindrical portion 27 of the ferrule 23 or is made slightly longer, the neck portion 30 of the sealing member is approximately 1/5 longer than collar 32.

Clamp bushing 24 comprises a cylindrical portion whose end 33 facing the interior of the tube is tapered inwardly and it is provided at its other end with a circular flange 34 having an outside diameter which is larger than the inside diameter of the cylindrical portion 27 of ferrule 23, so that after the introduction of clamp bushing 24 into the tube end portion and its following radial enlargement, flange 34 applies against flange 26 of ferrule 23 and prevents an axial yielding of the sealing member 25.

The fastening operation is similar to that described in connection with FIGS. 1 to 4. First the flange ferrule 23 is engaged over the tube 21 and then the sealing member 25 is inserted to an extent such that the front face 35 of the tube end 21 abuts against the circular web 36 of the sealing member 25. Thereupon, clamp bushing 24 is loosely inserted with its tapered end 33 first into sealing member 25 and the tube 21 and is subsequently radially enlarged. This is accomplished in the two-part matrix 8 and by means of the flaring expander to effect the arrangement shown in FIG. 6. In this arrangement, the tube end 21 and sealing member 25 are clamped with a certain deformation between the clamp bushing 24 at the inside and the flange ferrule 23 at the outside. As shown in FIG. 6, during the enlargement of clamp bushing 24, some material of sealing member 25 is displaced from area 30 to the area 31. An at least partial displacement of material also takes place in the area of the collar 32 of the sealing member 25 with the result of a form-closed connection between the tube 21 and the sealing member 25 or the ferrule 23. Due to this material displacement, not only a clamping connection is effective in the radial direction, but also a contact pressure acting on the front face 35 of the tube end 21 and on the inside surface of the flange 34 of bushing 24 is produced whereby a perfect tightness of the connection is ensured.

In this latter case in order to obtain a uniform distribution of forces between the ferrule and the tube and to prevent a shearing or cutting effect at the end of the ferrule, a greater length is provided for bushing 24 than for the ferrule 23.

While specific embodiments of the invention have been shown and described in detail to illustrate the application of the principles of the invention, it will be understood that the invention may be embodied otherwise without departing from such principles.

What is claimed is:

1. A fitment construction comprising a flexible tube having an annular end wall, a flange ferrule fitted over the exterior of said tube and having a flange aligned substantially with the end of said tube, a deformable clamp bushing having an unexpanded diameter smaller than the tube fitted into the tube and having a clamp bushing flange engaged over the flange of said flange ferrule, a seal member disposed between the flange of said clamp bushing, said flange ferrule, and the end of said tube, said tube comprising a tube having a spiral reinforcement therethrough forming at least one of the interior or exterior surfaces with corrugations, said deformable seal member having a hollow conical control portion engaged in said tube, and a collar portion engaged over the exterior of said tube and a web portion joining said collar portion and said conical central portion and being engaged over the end of said tube and said clamp bushing being expanded into engagement with the seal member and the wall of the tube so that said tube and seal member are captured and deformed between said clamp bushing and said flange ferrule.

* * * * *